United States Patent [19]

Le Tanter et al.

[11] Patent Number: 4,631,916
[45] Date of Patent: Dec. 30, 1986

[54] INTEGRAL BOOSTER/RAMJET DRIVE

[75] Inventors: Gérard Le Tanter, Castelnau Medoc; Bernard Luscan, Merignac, both of France

[73] Assignee: Societe Europeenne de Propulsion, France

[21] Appl. No.: 626,547

[22] Filed: Jul. 2, 1984

[30] Foreign Application Priority Data

Jul. 11, 1983 [FR] France ................. 83 11555

[51] Int. Cl.⁴ ............ F02K 3/00; F02K 7/00; F02K 9/00
[52] U.S. Cl. ........................ 60/245; 60/251; 60/262; 60/270.1; 60/253
[58] Field of Search .......... 60/251, 245, 270.1, 60/253, 254, 255, 256, 271, 262, 263, 226.1

[56] References Cited

U.S. PATENT DOCUMENTS

| | | | |
|---|---|---|---|
| 2,510,147 | 6/1950 | Skinner | 60/263 X |
| 3,094,072 | 6/1963 | Polk . | |
| 3,182,447 | 5/1965 | Bell et al. . | |
| 3,221,497 | 12/1965 | Forbes, Jr. | 60/251 |
| 3,319,424 | 5/1967 | Haake | 60/251 X |
| 3,482,403 | 12/1969 | Polk, Jr. | 60/245 |
| 3,807,170 | 4/1974 | Kesting | 60/251 X |
| 4,109,867 | 8/1978 | Ebeling . | |
| 4,277,940 | 7/1981 | Harner et al. | 60/270.1 X |
| 4,327,886 | 5/1982 | Bell et al. | 60/270.1 X |

FOREIGN PATENT DOCUMENTS 2943730 8/1980 Fed. Rep. of Germany ........ 60/251

OTHER PUBLICATIONS

Webster, F., "Integral Rocket/Ramjet Propulsion Flight Data Correlation and Analysis Techniques", *Journal of Aircraft and Rockets*, vol. 19, No. 4, pp. 326–336 (May 1982).

*Primary Examiner*—Carlton R. Croyle
*Assistant Examiner*—Timothy S. Thorpe
*Attorney, Agent, or Firm*—Scutty, Scott, Murphy & Presser

[57] ABSTRACT

A missile drive is provided comprising a single combustion chamber shared by a first, acceleration stage and a second, ramjet cruising stage, said chamber housing the solid propellant to be consumed during acceleration. At least one air inlet is opened at the end of the acceleration stage to allow an air flow to be introduced into the combustion chamber. Moreover, at least one additional exhaust outlet forming an additional nozzle is provided in the back of the combustion chamber and means are provided to seal off said additional exhaust outlet or outlets throughout the initial acceleration stage, such that said additional exhaust outlet or outlets contribute, together with the converging-diverging nozzle, to ejecting the exhaust gas during the ramjet cruising stage.

13 Claims, 8 Drawing Figures

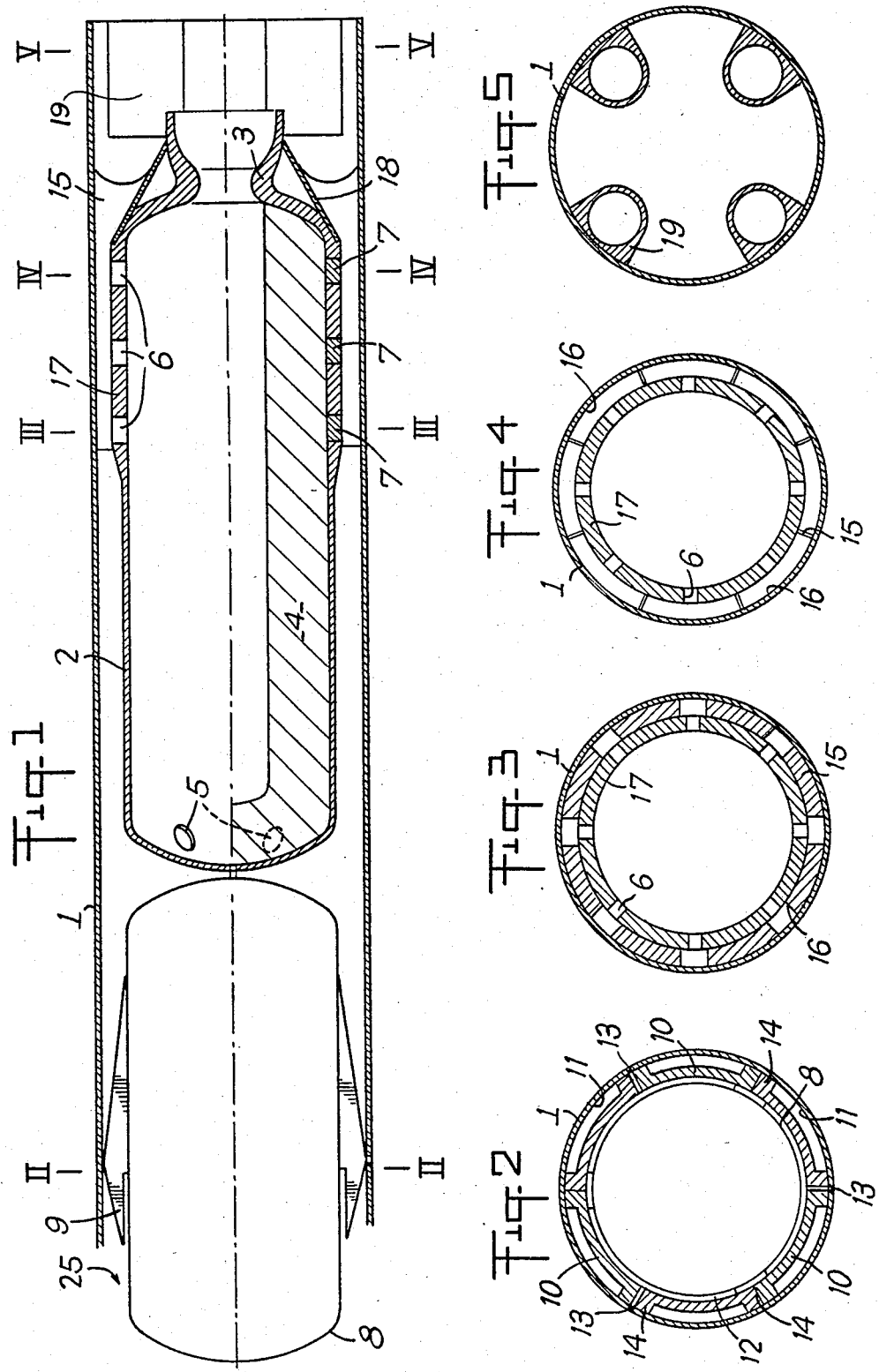

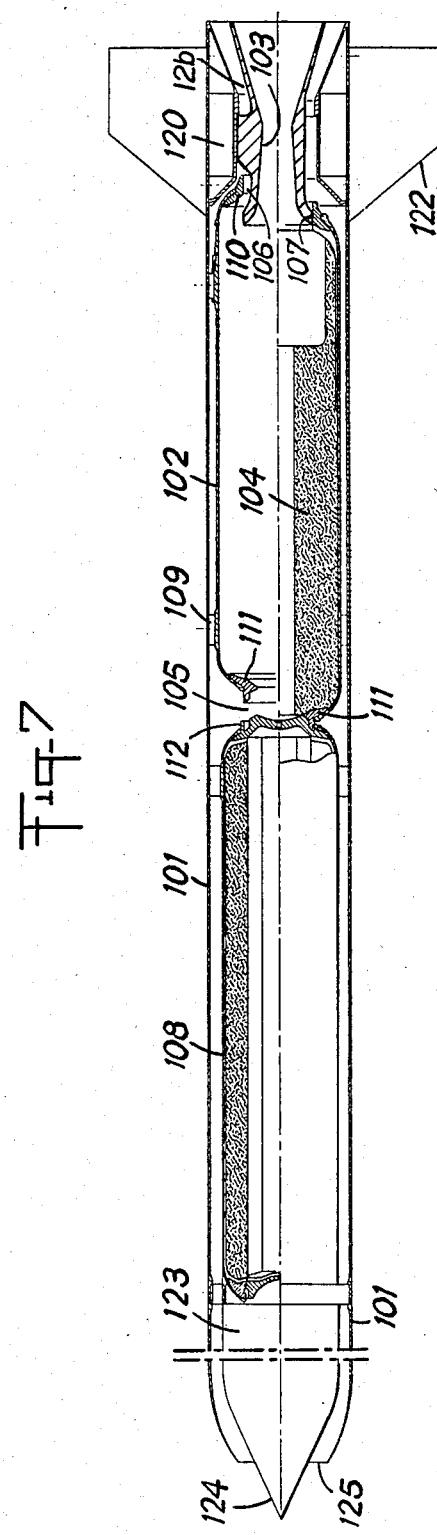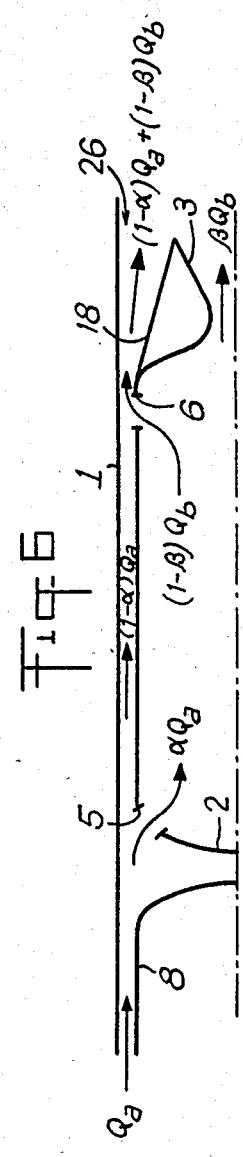

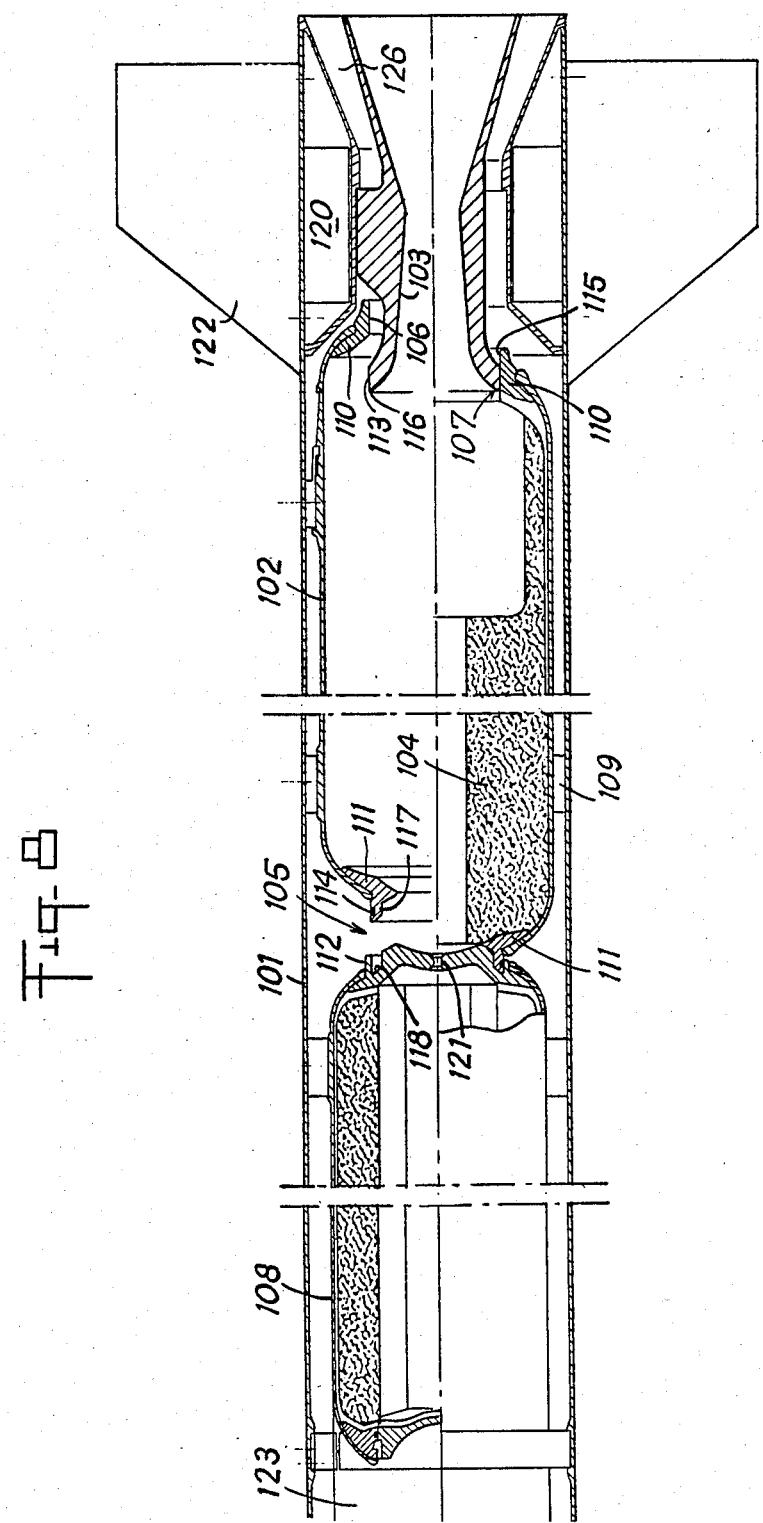

INTEGRAL BOOSTER/RAMJET DRIVE

This invention relates to a ramjet missile propulsion system or drive with a built-in acceleration engine or booster, said drive comprising a single combustion chamber, shared by a first, acceleration stage and a second, ramjet cruising stage, wherein is stored the solid propellant used for missile acceleration, and further comprising a convergent-divergent nozzle optimally dimensioned for acceleration stage propulsion and at least one air inlet designed to open after the acceleration stage is enable enough air to enter the combustion chamber to at least compensate the drag force on the missile by the high-speed ejection of the gases resulting from the combustion of ram air with the missile's fuel payload.

The invention thus concerns the propulsion of tactical-type missiles having a flight envelope within the atmosphere such that air can be used as one of the combustion agents in a ramjet engine.

Specifically, the invention concerns rocket ramjets operating with two successive propulsion modes, ie. a rocket engine acceleration stage using a fuel and an oxidizer both of which are carried aboard the missile, and a ramjet-based cruising stage using air scooped from the atmosphere by the moving missile with only the fuel carried aboard the missile.

Problems arise in the practical construction of such rocket ramjets due to the fact that the optimum nozzle for acceleration or boost must have a much narrower throat than the throat cross section of the nozzle most suitable for the subsequent ramjet cruising stage.

Solutions involving integrated ramjet and booster stages have been provided, using a single combustion chamber the inside wall whereof is common to both propulsion stages, said designs comprising a nozzle optimized for the acceleration stage, which is ejected during the transition phase between acceleration and cruising, to produce a larger opening in the tail end of the combustion chamber being better suited to ramjet cruising.

Unfortunately, for certain flights such as for example short, or medium range flights, ejection of the booster nozzle is unacceptable, since it constitutes a danger either for the missile operator or for friendly troops and populations.

In order to avoid the latter inconvenience, some prior art designs have done away with the booster nozzle. In such nozzle-less power plants, charging of the solid propellant required throughout the acceleration stage is arranged by providing a center channel and a divergent rear cone which together ensure stable combustion and axial thrust throughout the acceleration stage. Nevertheless, in this type of power plant combustion pressure considerably decreases as the missile accelerates such that the mean specific impulse during the acceleration stage is substantially downgraded compared with that which the same propellant would have provided had the exhaust gas been ejected through a nozzle.

Considering the fact that the length of the combustion chamber is generally dimensioned by the space required for the booster propellant and that any increase in the mass of this solid propellant entails an equivalent decrease in the mass of the ramjet fuel, any downgrading of performance in the acceleration stage entails a reduction of cruise time and consequently a proportional shortening of the missile's range.

It is the object of the present invention to remedy the above-mentioned disadvantages by providing for the escape of combustion gases produced during the acceleration stage through an actual nozzle having been optimized for this stage and by avoiding ejection of said nozzle whilst ensuring its suitability for subsequent operation in the ramjet cruising stage.

Accordingly, the invention provides a propulsion system or drive as defined at the beginning of the foregoing, having, besides the special air inlet or inlets, at least one additional exhaust outlet, in the form of an additional nozzle located in the downstream end of the combustion chamber, and means of closing said additional outlet or outlets throughout the initial acceleration phase, such that said additional outlet or outlets can also contribute, together with the main nozzle, to exhausting or combustion gases during the ramjet cruising phase.

In accordance with the invention, the main nozzle designed for the acceleration stage is kept in place during the cruising stage, but during said latter stage, only part of the exhaust gas is ejected through said main nozzle and the remainder is ejected through one or more additional outlets provided at the back of the combustion chamber, said outlets, like the previously-mentioned chamber air inlets, being opened only once all of the solid propellant used for acceleration has been consumed.

In a first embodiment of the invention, said additional outlet or outlets are provided in the back wall of the combustion chamber in order to provide a substantially axial additional exhaust.

In another embodiment, said additional outlet or outlets are provided in an annular, rear lateral part of the combustion chamber.

The propulsion system according to the invention is advantageously further provided with an external structure surrounding the combustion chamber substantially to the rear end of said chamber and extending forward of the chamber at least partly along the length of the missile body so as to provide a permanent air scoop at the front of the missile and ensure ram air flow to the combustion chamber via said air inlets whilst maintaining the casing of the combustion chamber under balanced pressure during the ramjet cruising stage, such that during said cruising stage, only a part of the air taken in by the missile's air scoops is introduced into the combustion chamber via the air inlet holes while the remaining air flow is discharged behind the missile via purposely provided outlets without having passed through the combustion chamber but having nevertheless been mixed with at least that portion of the exhaust gas exiting via the additional exhaust outlets.

Said external structure can be extended backwards beyond the main nozzle to enable mixing of the secondary air flow with all of the exhaust gas from the combustion chamber.

Splitting of the air flow into a portion $\alpha Q_a$ which is admitted by the air inlets and contributes to combustion and a portion $(1-\alpha)Q_a$ which constitutes the cooling flow is determined as a function of the thrust required and of the temperature withstandable by the combustion chamber wall.

The combustion chamber is centered with the help of struts inserted between the casing of said chamber and said previously-mentioned external structure. In the embodiment with additional exhaust outlets provided in the shell said struts can be shaped such that the cross section of the air passage between the external structure and the combustion chamber casing provides for sonic flow of both the air upstream from the additional exhaust outlets and the air and combustion gas mixture downstream from the additional exhaust outlets.

The combustion chamber is preferrably given a thin, heat-conducting wall.

A number of other special features may also be advantageously provided as follows.

Conical, ie. two-way tapering ramps are inserted between the external structure and the fuel tank upstream from the combustion chamber air inlets to define an annular air scoop.

During the acceleration phase, the missile's air scoops are not sealed off downstream, thus allowing the ram air to be discharged through the rear to reduce drag.

A substantially conical fairing connects the rear neck of the combustion chamber to the outlet plane of the tapered out section of the main axial nozzle to form a central body establishing a diffuser in which the secondary air flow/exhaust gas mixture can expand.

In one specific embodiment, the air inlets and the additional exhaust outlets are sealed off during the acceleration stage by means of plugs specially designed to be ejected at the end of said acceleration stage.

Alternatively, the combustion chamber can be designed so as to be automatically pushed back axially by the gas pressure at the end of the acceleration stage over a pre-established distance to clear the chamber openings while arranging, on the one hand, a space between the fuel tank and the chamber such as to form the air inlets and, on the other hand, a space between the chamber and the main nozzle such as to form the additional exhaust outlets. Depending on the applications envisaged, the combustion chamber's sliding action thus serves either to open the air inlets, or the additional outlets, or both the inlets and outlets simultaneously.

More specifically, the sliding combustion chamber is initially immobilized by means of a shearable tie and the geometrical configuration of said chamber is such that at the end of the acceleration stage, the direction of the axial resultant of the pressure forces on the chamber reverses and said resultant becomes greater than the resistance of the shearable tie.

Other features and advantages of the invention will become more readily apparent in reading the following description of a few selected embodiments, with reference to the appended drawings in which:

FIG. 1 is a cross-sectional diagram, taken axially, of a first embodiment of the propulsion system according to the invention;

FIGS. 2 through 5 are cross-sectional views taken along II—II, III—III, IV—IV and V—V respectively of FIG. 1;

FIG. 6 is a schematic illustration of the principle of a dual air flow adapted to a propulsion system according to the invention;

FIG. 7 is a full cross-sectional view, taken axially, of a missile according to a second embodiment of the invention, showing, in a first half-cross-sectional view, the working during the acceleration stage, and in a second half-cross-sectional view, the working during the cruising stage; and FIG. 8 is an enlarged view of part of the missile shown in FIG. 7.

This invention can be readily applied to the various configurations of ram rockets with integral boosters. In fact, the air scoops required for the ramjet stage of operation can be arranged in a number of different ways, including at the front, annularly, in the nose, as well as ventrally or laterally. Similarly, the fuel required for the cruising stage can be either liquid or solid. In the latter case it can be placed in an auxiliary self-pyrolyzing fuel generator or in contact with the inside wall of the combustion chamber.

Referring now to FIG. 1, the front part of the missile equipped with the drive according to the invention is not shown. Only the fuel tank 8 and the combustion chamber 2 are shown, both surrounded by an external tubular structure 1 extending toward the back of the missile beyond the main exhaust nozzle 3. Said comustion chamber 2, attached to said external structure 1, contains the propellant 4 required for the acceleration stage (see the lower half-cross-sectional view of FIG. 1). As long as fuel is stored therein and throughout the acceleration stage, the chamber's air inlets 5 remain sealed by plugs. In the ramjet stage, the fuel stored in the auxiliary tank 8 located upstream from the combustion chamber 2 is injected into the combustion chamber 2 and the combustion air scooped by the moving missile is introduced into the combustion chamber 2 via the inlets 5 which have now been opened (see the upper half-cross-sectional view of FIG. 1).

The embodiment illustrated in FIGS. 1 through 5 is associated with frontal air scoop designs with said air scoops being located either in the nose cone or, in annular form, downstream from the equipment which must be readily accessible, namely the charge and the instrumentation compartment. In both cases secondary air is taken in upstream from the combustion chamber 2 and allowed to circulate about the outside wall of combustion chamber 2 as a whole, thus providing chamber cooling and preheating of said secondary air at the same time.

More specifically, the embodiment shown in FIG. 1 is provided with an annular air scoop 25 in line with the fuel tank 8. As can be seen from FIGS. 1 and 2, the air is scooped between an external tubular structure 1 and a two-way tapering ramp 9 whose geometry defines the features of the air scoop 25.

FIG. 2, which is a cross-sectional view of the missile in the plane of the scoop, shows how the ramp 9 is made. As shown in FIG. 2, this ramp consists of three segments 10 made for example of a composite casting. These three segments 10 of ramp 9 fulfill three functions: they define the opening 11 of the air scoop 25, which is bounded by said segments 10 and said external structure 1; secondly, they provide, together with the clearances 12 between the tank 8 and the ramp 9 and with the openings 13 between said segments 10, a boundary layer trap; and thirdly, they contribute to centering and securing the external structure 1 on the fuel tank 8, by means of the projections 14 on said segments 10 serving as bearings thereof.

The combustion chamber 2 is secured and centered within the external structure 1 at the rear of the missile by means of struts 15. As indicated by FIGS. 3 and 4, the width of said struts 15 is not constant, but changes between the axial position represented in cross section in FIG. 3, in which plane are contained the first additional exhaust outlets 6 provided in combustion chamber 2, and the axial position further downstream represented in cross section in FIG. 4 containing the most downstream additional exhaust outlets 6. Said struts 15 have a relatively substantial width in the plane of FIG. 3. Said width is calculated so that the available cross section 16 for passage of the secondary air flow running between the combustion chamber 2 and the external structure 1, and thereby already preheated, provides a sonic flow. Between the radial planes illustrated in FIGS. 3 and 4 several sets of additional exhaust outlets 6 serve, during the cruising stage, to inject exhaust gas into the secondary air stream formed between external structure 1 and combustion chamber 2. The width of said skids 15 is reduced in the plane of FIG. 4 and is calculated to ensure that the cross section 16 available for the downstream runout of the exhaust gas is such as to also have a sonic mixture of combusted gas and secondary air flow.

Downstream from the plane of FIG. 4, the exhaust gas/secondary air flow mixture expands in a sort of central body 18. Said central body 18 forms a basically conical fairing connecting the rear necking of the combustion chamber 2 with the tapering out portion of the main axial nozzle 3 associated with the combustion chamber 2.

The furthest downstream part of the external structure 1 (FIG. 5) can be provided with casings 19 of heat insulating material to house the control surfaces servomotors in the case said control surfaces must be located at the back of the missile.

The lower half-cross-section of FIG. 1 shows the state of the combustion chamber 2 prior to the acceleration stage, with the booster propellant 4 masking the air inlets 5 as well as the additional exhaust outlets 6, said outlets being further sealed by means of plugs 7. The other half-cross-section of FIG. 1 shows the combustion chamber 2 configured for the ramjet cruising mode, with the air inlets 5 and the additional exhaust outlets 6 for injecting the combustion gases into the secondary air stream now open.

During the acceleration stage, the air inlets 5 are obstructed by plugs 7 bearing against the inside wall of the combustion chamber 2. Said plugs are naturally ejected in the transition between the two propulsion modes. Any suitable well known blow-out plug that will be released from the outlet 6 due to surrounding conditions may be used. The additional outlets 6 closing plugs 7 are ejected for example, by means of pressure when the solid propellant in the chamber 2 has been consumed. In addition, the ejection of plug 7 may be facilitated for example by means of springs at the end off the propellant combustion tail.

According to one specific embodiment of the invention, the combustion chamber 2 is fabricated by filament winding, for example of phenolic silica, and the fibers wind around inserts placed about the winding core at the location of the air inlets 5. The additional outlets 6 can be made in the same way. However, if the wall of the combustion chamber 2 is reinforced in the area 17 where the additional outlets 6 are to be provided, said outlets will be more easily provided by machining.

The operation of the missile according to the invention during ramjet cruising will be more readily understood with the help of FIG. 6. This figure schematically illustrates with a lengthwise half-cross-sectional view, the external structure 1, the fuel tank 8, the air inlets 5, the exhaust outlets 6, the main nozzle 3 and the body 18. It can be clearly seen from the configuration in the figure that only part $(\alpha Qa)$ of the air flow $Qa$ drawn by air scoop 25 is introduced into the combustion chamber 2 via said air inlets 5, $\alpha$ having a value less than 1. The remainder $(1-\alpha)Qa$ of the ram air $Qa$ makes up the secondary air which flows between the combustion chamber wall and the external structure 1 and does not take part in combustion.

Similarly, part $\beta Qb (\beta <1)$ of the exhaust gas $Qb$ exhausts axially via the main nozzle 3, while the remainder thereof $(1-\beta)Qb$ exhausts via the additional exhaust outlets 6 and mixes with the flow of secondary air $(1-\alpha)Qa$. If the external structure 1 is extended downstream from the nozzle 3 far enough, it is possible to achieve mixing of all of the exhaust gas with the secondary air, the flow $\beta Qb$ of gas issuing from the main nozzle being thoroughly mixed with the flow $\{(1+\alpha)Qa+(1-\beta)Qb\}$ of gas running out on the outside of said nozzle via an annular opening 26.

The dual-flow mode of operation according to the invention, ie. involving a secondary air flow $(1-\alpha)Qa$ running between the combustion chamber 2 and the external structure 1, which then mixes with at least a part $(1-\beta)Qb$ of the exhaust gas, provides a number of advantages over conventional single-flow operation.

The primary advantage stems from the reduction of the velocity of the gases in chamber 2. This not only limits pressure drop and the convection coefficient at the wall, but, more importantly, promotes thorough combustion due to a longer stay in the chamber, the physical length of said combustion chamber 2, being defined in practice by the volume of booster propellant, being in fact roughly the same as for a single-flow ramjet design. Thus, good flame stabilization as well as greater efficiency of combustion result from the low velocity in the chamber.

Another advantage is provided by the possibility of efficiently cooling the shell of chamber 2, for the coefficient of external convection to the non-combusted air is significantly greater than the coefficient of internal convection with the hot gases. Since the calories passing through the wall of the combustion chamber contribute to heating and accelerating the secondary air flow, nothing prevents the walls of the chamber from being made thin and heat-conducting, providing they are made from an oxidation-resistant material. This is advantageous to the extent that any reduction in thickness of the chamber walls enhances the missile's overall performance by freeing more space for booster propellant and/or ramjet fuel.

Moreover, in a dual-flow type ramjet engine, the combustion chamber shell is under balanced pressure. The internal pressure differential in the cruising mode becomes nil upstream and remains small downstream.

Furthermore, it deserves to be emphasized that during the acceleration stage with a conventional integral booster ramjet the combustion chamber air inlets are necessarily closed and consequently the missile's ram air augments drag, by $\Delta F$, for no useful purpose. The increase in drag on a dual-flow ramjet during the acceleration stage on the other hand is limited to $\alpha \Delta F$, $\alpha$ being a coefficient less than 1 standing for the proportion of air injected through the inlets 5 during the cruising stage. Compared with a conventional ramjet engine therefore, this invention enables recovery of an amount of thrust $(1-\alpha)\Delta F$ which is added to the thrust of the solid propellant drive during the missile's acceleration stage.

To summarize, a propulsion system or drive according to the present invention makes it possible, as with nozzle-less booster ramjets, not to jettison any heavy, compact body, while at the same time enabling a performance comparable to that of ejectable nozzle ram rockets.

A second embodiment of the invention is depicted in FIGS. 7 and 8 according to which opening of the air inlets 105 and of the additional exhaust outlets 106 for combustion gas is done automatically thanks to the sliding action imparted to the frame of the combustion chamber.

The drive system illustrated in FIGS. 7 and 8 comprises a nozzle 103 specifically designed for acceleration stage operation and attached to the missile's external structure 101, said latter structure withstanding both internal pressure and flight stresses. A combustion chamber 102, initially containing the booster propellant, is positioned with respect to said external structure 101 by means of struts 109 establishing a free space between the external structure 101 and the wall of chamber 102. Chamber 102 can slide backwards when during the booster combustion tail the resultant of the pressure forces on the head of the chamber becomes greater than the resistance of a shearable tie. A tank 108 located upstream from the chamber 102 contains the solid self-combustible fuel for the ramjet cruising stage. Said tank or store 108 ignites from proximity alone and contributes to the impulsing of the booster. In ramjet-type operation, the gases are fired spontaneously at contact with the oxygen. No special ignitor is therefore required for the cruising stage.

The booster operates in the same way as in the first embodiment described hereinabove. An ignitor placed in said nozzle 103 starts combustion of the solid propellant placed in the combustion chamber 102.

As the missile accelerates, the ram air pressure increases and when the direction of the resultant of the booster's internal pressure and of the external air pressure on the body of the combustion chamber 102 reverses, during the combustion tail, said resultant eventually becoming greater than the strength of a shearable tie serving to initially immobilize said combustion chamber 102, said justmentioned chamber slides back to open annular spaces 105 and 106 at the front and the back respectively, so respectively allowing air entry to the chamber 102 and exhaust of the spent mixture. The transition between the two propulsion modes (rocket to ramjet) thus differs from that of the first-mentioned embodiment. During the cruising stage, the very rich combustion products generated in the chamber 102 are partly mixed with the secondary air flow in the free space 126 forming an open annular chamber between the external structure 101 and the main nozzle 103 of combustion chamber 102, downstream from the annular space 106 forming an additional nozzle. The servomotors driving the control surfaces 122 can be housed in add-on casings 120 of the external structure 101, in the space forming a mixing chamber.

The self-pyrolyzing solid propellant tank 108 communicates with the combustion chamber 102 via an axially located outer opening 121 provided in the rear end of said tank 108. The nose cone 123 located ahead of tank 108 includes a point 124 which, together with the front end of the external structure 101, establishes an annular front air scoop 125. This configuration has the advantage of ensuring a good aerodynamic performance and preserving the missile's symmetry of revolution. The air inlet 105 into the combustion chamber 102 which is formed during the cruising stage is annular. The cross-sectional area of air inlet 105 is roughly half that of the combustion chamber 102. The widening of cross-sectional area accordingly formed has the effect of recycling air to stabilize combustion.

The main nozzle 103, the rear end fitting 110 of the combustion chamber 102 which bears against the nozzle 103 during the acceleration stage and the respective end fittings 111 and 112 of the front of the combustion chamber 102 and the rear of the tank 108 which cooperate to seal the combustion chamber 102 during the acceleration stage, are fabricated with short fibers, such as for example, molded short silica fibers in a phenolic resin matrix, thus avoiding any problems or differential expansion as would be likely to occur with metal parts.

In the embodiment of FIGS. 7 and 8, the rear end fitting 110 of the combustion chamber has a cylindrical section 115 of revolution about the axis of the missile. In starting position, said section 115 surrounds a matching cylindrical section 116 of the nozzle 103 and applies to said section 116 in an airtight manner, a seal 113 being furthermore provided between the coaxial cylindrical sections 115 and 116 such that said two sections form a means 107 of sealing the additional annular outlet 106. In the transition from the acceleration stage to the cruising stage, said outside cylindrical section 115 simply slides over said inside cylindrical section 116, thus clearing an additional annular exhaust outlet 106. At the front of combustion chamber 102, said end fitting 111 is provided with a cylindrical flange of revolution 117, which in starting position engages in a mating slot 118 of the rear end fitting 112 of tank 108, a seal 114 being arranged between the flange 117 of end fitting 111 and the slot 118 of end fitting 112. The slot 118 and flange 117 have opposite faces parallel to the missile centerline so as to enable smooth sliding in the transition from the acceleration to the cruising mode.

For example, the ratio of the cross sectional area of the air scoop 125 to that of the reference cross section consisting of the cross sectional area of the combustion chamber 102 can be in the neighborhood of 0.4, whereas the ratio of the cross section of the air inlet 105 to that of said combustion chamber 102 is about 0.5. The ratio of the throat cross section of main nozzle 103 to same said combustion chamber cross section can be about 0.06 and the cross section of the additional exhaust outlet or outlets 106 can be about twice that of said nozzle 103 throat, whereas the cross-sectional area for the flow of secondary air between the external structure 101 and the chamber 102 can be on the order of 1.4 times the cross-sectional area of the main nozzle 103.

What we claim is:

1. An integral booster ramjet missile drive comprising a single combustion chamber shared by a first, acceleration stage and a second, ramjet cruising stage, said chamber having a casing with a rear necked portion, said chamber housing a stored solid propellant used for missle acceleration, a converging-diverging nozzle optimally dimensioned for acceleration stage propulsion and at least one air inlet designed to open at the end of said acceleration stage to enable enough air to enter the combustion chamber to at least compensate for a drag force on the missile by a high-speed ejection of gases resulting from the combustion of ram air with the stored solid propellant, said drive further comprising at least one additional exhaust outlet forming an additional nozzle located at the downstream end of the combustion chamber, and means of closing said at least one additional exhaust outlet throughout the initial acceleration stage, such that said at least one additional outlet contributes, together with said converging-diverging nozzle, to exhausting the combustion gases during the ramjet cruising stage.

2. A ramjet missile drive as in claim 1, wherein said additional exhaust outlets are provided in the back wall of the combustion chamber to provide a substantially axial additional exhaust.

3. A ramjet missile drive as in claim 1, wherein said additional exhaust outlets are provided in an annular, rear lateral part of said combustion chamber.

4. A ramjet missile drive as in claim 1, further provided with an external structure surrounding said combustion chamber and extending forward over at least part of the length of the missile body so as to provide a permanent air scoop at the front of the missile and ensure ram air flow to the combustion chamber via said air inlets while maintaining the casing of the combustion chamber under balanced pressure during the ramjet cruising stage, such that during said cruising stage only a part ($\alpha Qa$) of the ram air ($Qa$) taken in by the missile's air scoops is introduced into the combustion chamber via said air inlets while the remaining air flow $(1-\alpha)Qa$ is discharged behind the missile via purposely provided outlets without having passed through the combustion chamber but having nevertheless been mixed with at least that portion $(1-\beta)Qb$ of the exhaust gas exiting from the combustion chamber via said additional exhaust outlets.

5. A ramjet missile drive as in claim 4, wherein said missile's external structure is extended backwards beyond the main nozzle to enable mixing of the secondary air flow with all of the exhaust gas from the combustion chamber.

6. A ramjet missile drive as in claim 4, further provided with struts between the casing of the combustion chamber and said external structure, said struts being shaped so that the air flow cross section between said external structure and said chamber casing provides for sonic flow of both the air $(1-\alpha)Qa$ upstream from said additional exhaust outlets and the air and combustion gas mixture $(1-\beta)Qb+(1-\alpha)Qa$ downstream from said additional exhaust outlets.

7. A ramjet missile drive as in claim 6, the combustion chamber whereof has a thin, heat-conducting wall.

8. A ramjet missile drive as in claim 7, wherein said air scoops are not sealed off downstream during the acceleration stage to enable rearward discharge of the ram air.

9. A ramjet missile drive as in claim 8, wherein a central body is provided, connecting said rear necked portion of the combustion chamber to an outlet plane of the divergent portion of the converging-diverging nozzle constituting a main axial nozzle, said central body forming a conical fairing defining a divergent nozzle wherein the air and combustion gas mixture $(1-\alpha)Qa+(1-\beta)Qb$ is allowed to expand.

10. A ramjet missile drive as in claim 9, wherein said air inlets as well as said additional exhaust outlets are sealed off during the acceleration stage by special plugs designed to be ejected at the end of said acceleration stage.

11. A ramjet missile drive as in claim 9, the combustion chamber whereof is designed to be automatically displaced by the pressure applied by the gases, axially backwards over a predetermined distance, at the end of the acceleration stage, thus opening said air inlets and/or additional exhaust outlets provided in the combustion chamber.

12. A ramjet missile drive as in claim 11, the sliding combustion chamber whereof is initially held immobilized by means of a shearable tie and the combustion chamber whereof is so shaped as to ensure that at the end of the acceleration stage, the direction of the axial resultant of the pressure forces on said chamber reverses and said resultant becomes greater than the strength of said shearable tie.

13. A ramjet missile drive as in claim 12, wherein said main nozzle and the end fittings of the combustion chamber and fuel tank are made by molding short fibers.

* * * * *